(12) United States Patent
Hicks

(10) Patent No.: US 11,939,185 B2
(45) Date of Patent: Mar. 26, 2024

(54) SPRING LOADED RETRACTABLE DEVICE

(71) Applicant: Jeiko Innovations Oy, Hyvinkää (FI)

(72) Inventor: Richard Hicks, Kingston Upon Thames (GB)

(73) Assignee: Jeiko Innovations Oy, Hyvinkää (FI)

(*) Notice: Subject to any disclaimer, the term of this patent is extended or adjusted under 35 U.S.C. 154(b) by 427 days.

(21) Appl. No.: 17/277,744

(22) PCT Filed: Sep. 20, 2019

(86) PCT No.: PCT/FI2019/050681
§ 371 (c)(1),
(2) Date: Mar. 19, 2021

(87) PCT Pub. No.: WO2020/058581
PCT Pub. Date: Mar. 26, 2020

(65) Prior Publication Data
US 2022/0119221 A1    Apr. 21, 2022

(30) Foreign Application Priority Data

Sep. 21, 2018 (FI) .................................. 20185793
Dec. 7, 2018 (FI) .................................. 20186058

(51) Int. Cl.
*B60P 7/08* (2006.01)
*B65H 75/44* (2006.01)
*B65H 75/48* (2006.01)

(52) U.S. Cl.
CPC ......... *B65H 75/48* (2013.01); *B65H 75/4439* (2013.01); *B60P 7/0846* (2013.01); *B65H 2407/10* (2013.01)

(58) Field of Classification Search
CPC ....... B65H 75/48; B65H 75/4439; B60P 7/06; B60P 7/08; B60P 7/0823; B60P 7/0846
See application file for complete search history.

(56) References Cited

U.S. PATENT DOCUMENTS

| | | | |
|---|---|---|---|
| 7,503,736 B1 | 3/2009 | Chen | |
| 7,621,856 B1 | 11/2009 | Keith et al. | |
| 8,408,521 B2 * | 4/2013 | Huang | ................. B60P 7/0846 254/218 |
| 9,266,462 B2 * | 2/2016 | Miller | ..................... B60P 7/083 |
| 9,339,014 B1 | 5/2016 | Wettermann et al. | |
| 9,770,012 B2 | 9/2017 | Chappell et al. | |
| 2013/0326847 A1 | 12/2013 | Zheng | |
| 2016/0278345 A1 | 9/2016 | Holmstrom | |
| 2017/0089682 A1 | 3/2017 | Feuerstein et al. | |

FOREIGN PATENT DOCUMENTS

| | | |
|---|---|---|
| CN | 104512769 A | 4/2015 |
| DE | 102012105250 A1 | 12/2013 |
| WO | WO2015036724 A1 | 3/2015 |

* cited by examiner

*Primary Examiner* — Sang K Kim
(74) *Attorney, Agent, or Firm* — Laine IP Oy

(57) ABSTRACT

According to an example aspect of the present invention, there is provided a spring loaded retractable device comprising a frame, a movable part hinged to a first pin and comprising an opening radially aligned to the first pin, wherein a strap is movable through the opening, and wherein the movable part is configured to move from a first position into a second position by rotating around an axis of rotation due to friction between the movable part and the moving strap.

18 Claims, 11 Drawing Sheets

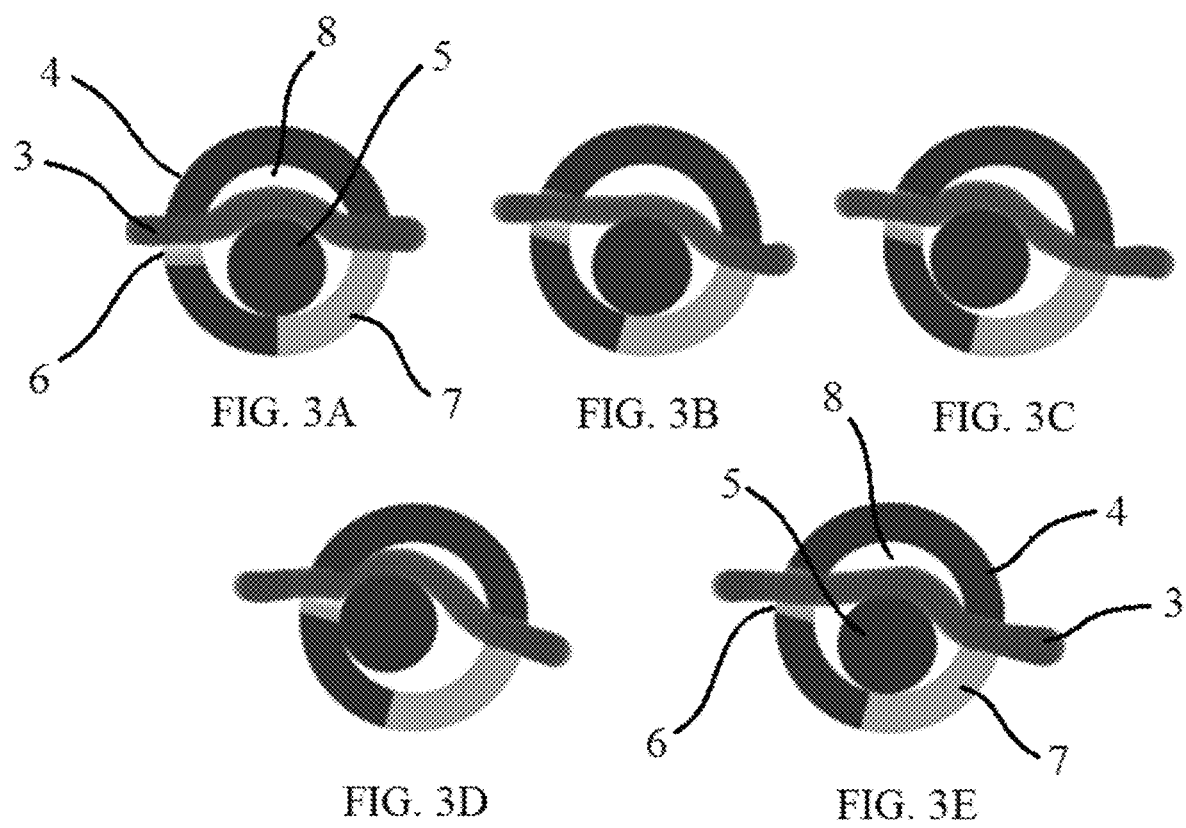

SPRING LOADED RETRACTABLE DEVICE

FIELD

The present invention relates to a spring loaded retractable device.

Further, the present invention relates to a method of manufacturing a spring loaded retractable device.

Certain embodiments of the present invention relate to an injury preventing retractable spring loaded securing device for the securing of cargo or the securing of an object and, more particularly, to securing devices comprising straps of various types.

Certain other embodiments of the present invention relate to an injury preventing retractable spring loaded device for use as an animal leash.

BACKGROUND

Cargo is often loaded on a storage rack or a transport vehicle. In such cases, it is advantageous to secure the cargo using a securing device. A securing device may, for example, comprise a strap and a hook which is attached to one extremity of the strap.

When cargo is loaded onto a storage rack or a vehicle, for example a conventional freight vehicle, a freight trailer, or pickup truck, the cargo is often tied down appropriately to ensure the stationary stability of the load to keep the load intact and/or prevent the dropping of the cargo during the shipping process. Instead of or in addition to the use of a hook an end of the strap, some straps involve the use of a hand-operated pulling device to tighten the straps into a holding state, thereby preventing their loosening. Such straps are also called ratchet straps.

Some devices are so called retractable devices which utilize the stored energy of a wound clock spring to rewind an extended strap, tape, cord or line onto a spool when a button is pushed by a user. Such a retractable device may be, for example, a securing device for securing cargo or a dog leash.

For example, patent document U.S. Pat. No. 7,503,736 B1 discloses a hand-operated pulling device with automatic spring recoil that is engaged by mechanically pushing a button. In order for the strap to retract fully the spring must be powerful which in turn causes a very dangerous situation when the hook or attachment means of the strap is fully pulled out of the ratchet spool. When pushing the button, the hook swings back with a lot of force caused by the spring and it has a very high potential to cause injuries of different severity, in worst case causing injury to eye sight when the hook or metallic attachment means swings back towards the device and in effect at the user.

Document WO 2015/036724 A1 discloses a carrying device where a similar spring construction is used and due to the construction, when the recoil is engaged by mechanically pushing a button, the strap begins to retract with a very high force. In order for the strap to retract fully the spring must be powerful which in turn causes a very dangerous situation when the attachment means connected to the strap is fully pulled out of the ratchet spool where the strap is rolled on, after use. When pushing the button, the hook swings back with a lot of force caused by the spring and it has a very high potential to cause injuries of different level, in worst case causing injury to eye sight when the hook or the metallic attachment means swings back towards the device and in effect at the user.

The recoil speeds of such retractable devices can exceed 6-8 m/s and accidents associated with such recoil speeds are well documented, for example under:
http://www.technology-assoc.com/highlights/1-3-million-settlement-after-retractable-dog-leash-malfunction.html, viewed on Sep. 19, 2018, and
http://fayettedogtrainer.blogspot.com/2013/10/why-i-never-recommend-retractable.html, viewed on Sep. 19, 2018

A weaker spring may be used as a solution to reduce the risk of injuries caused by the swinging attachment means. However, a weaker spring would typically not be able to retract the full length of the strap.

Therefore, it would be advantageous to provide a device that would have the retractable feature, which would be possible to roll in to the neat original position without any danger to the user.

In view of the aforementioned, it would be beneficial to provide a securing or carrying device in the form of a spring loaded retractable device that eliminates or at least reduces dangerous situations caused by a swinging attachment means attached to the strap, leash, etc.

SUMMARY OF THE INVENTION

The invention is defined by the features of the independent claims. Some specific embodiments are defined in the dependent claims.

According to a first aspect of the present invention, there is provided a spring loaded retractable device comprising a frame, a movable part hinged to a first pin or to the frame and comprising an opening radially aligned to the first pin, wherein a strap is movable through the opening, and wherein the movable part is configured to move from a first position into a second position by rotating around an axis of rotation due to friction between the movable part and the moving strap.

Various embodiments of the first aspect may comprise at least one feature from the following bulleted list:
 - a shape of the opening corresponds substantially to a cross-section of the strap
 - the opening is longitudinal and corresponds substantially to a width of the strap
 - the opening is circular and corresponds substantially to a diameter of the strap
 - the opening is arranged at a distance from the axis of rotation of the movable part
 - the axis of rotation is formed by the first pin
 - the first pin is fixedly connected to the frame
 - the device further comprises a guide pin between the first pin and a spool
 - the strap is movable between the first pin and the guide pin
 - the device is configured such that the moving strap contacts a second pin or a structure in the second position
 - the device is configured such that friction between the second pin or the structure and the moving strap reduces speed of the moving strap in the second position
 - the structure is a part of a housing of the device
 - the device comprises a lip projecting from the movable part
 - the movable part further comprises a trailing edge
 - the device is configured such that the moving strap contacts the trailing edge in the second position the device is configured such that friction between the trailing edge and the moving strap reduces speed of the moving strap in the second position the device is configured such that friction between at least one surface, for example two surfaces, of the moving part and the moving strap reduces speed of the moving strap in the second position the device is a securing device, a tape measure, a dog leash or an animal leash According to a second aspect of the present invention, there is provided a spring loaded retractable device comprising a frame, a first part having an aperture, and a second part, wherein the second part is fixedly connected to the frame and the first part is configured to rotate relative to the second part due to friction caused by a moving strap in order to reduce the speed of the moving strap.

According to a third aspect of the present invention, there is provided a spring loaded retractable device comprising a frame, a hollow first part having a first opening and a second opening, and a second part arranged at least partially within the hollow first part, wherein the second part is fixedly connected to the frame and the hollow first part is configured to move relative to the second part due to friction caused by a moving strap or wherein the hollow first part is fixedly connected to the frame and the second part is configured to move relative to the hollow first part due to friction caused by a moving strap.

Various embodiments of the third aspect may comprise at least one feature from the following bulleted list:

the hollow first part is configured to move relative to the second part due to friction caused by a strap moving through the first opening of the first part, a cavity of the first part and the second opening of the first part the first part is in the form of a tube or the cross section of the first part is in the form of an ellipse or polygon the second part is in the form of a tube or cylinder or the cross section of the second part is in the form of an ellipse or polygon the first part and the second part are axially aligned the dimensions of the first opening and the second opening are identical or different the device is configured to reduce a speed of the moving strap the device is a securing device, a dog leash or an animal leash According to a fourth aspect of the present invention, there is provided a method of manufacturing a spring loaded retractable device, the method comprising providing a spring loaded retractable device having a frame, coupling a movable part comprising an opening radially aligned to a first pin to the frame, and arranging a strap such that the strap extends through the opening to a guide pin. The movable part is arranged such that the movable part is capable of rotating about an angle due to friction caused by the strap when the strap moves.

According to a fifth aspect of the present invention, there is provided a method of manufacturing a spring loaded retractable device, the method comprising providing a spring loaded retractable device having a frame, providing a hollow first part having a first opening and a second opening, arranging the first part such that a second part is located within the hollow first part and fixedly connected to the frame, arranging a strap such that a part of the strap extends through the first opening of the first part, a cavity within the first part and the second opening of the first part. According to an embodiment, the first part is arranged such that the first part is capable of moving relative to the second part due to friction caused by the strap when the strap moves or wherein the second part is arranged such that the second part is capable of moving relative to the first part due to friction caused by the strap when the strap moves.

According to a sixth aspect of the present invention, there is provided a securing device comprising a strap in rolled up and in ready to use position loaded on a spring housed within a securing device frame, another shorter strap and both of these straps having hooks or another type of attachment means connected to the frame of the device and meant for cargo securing purposes. The frame of the securing device has a free moving dynamic clamp controller installed as the feeding mouth of the strap that adapts it's position by taking in the spring force by slightly moving according to the force caused by the spring mechanism thus preventing too powerful retraction of the strap while the spring itself can be even more powerful and yet the injuries of too powerful retraction is avoided due to the clamp mechanism automatically adjusting the retraction speed by changing the position in different phases of the retraction while the durability of the spring or the benefit of retractability are not compromised.

According to a seventh aspect of the present invention, there is provided a carrying device comprising of a strap rolled up and in ready to use position loaded on a spring housed within a securing device frame with the strap having connection means to the other side of the carrying device or the strap might be directly connected to the other side of the carrying device by effectively having only a single strap. The frame of the securing device has a free moving dynamic clamp controller installed at the feeding mouth of the strap that adapts it's position by taking in the spring force by slightly moving according to the force caused by the spring mechanism thus preventing too powerful retraction of the strap while the spring itself can be even more powerful and yet the injuries of too powerful retraction is avoided due to the clamp mechanism automatically adjusting the retraction speed by changing the position in different phases of the retraction while the durability of the spring or the benefit of retractability are not compromised.

According to an eighth aspect of the present invention possibly including, or excluding the device of having the dynamic clamp system the cargo or carrying device could be equipped with a weaker spring, but include a winding handle to provide even more safe retractable cargo securing or carrying device, whilst enabling the device to be usable even years after the spring has lost its power.

According to a ninth aspect of the present invention possibly including, or excluding the device of having the dynamic clamp system and the previously disclosed winding handle, contrary to obvious solution the device instead could have a stronger spring construction while it would also have an extra bar installed to either inside or outside the frame of the product that could possibly, but not necessarily, be rotatable. The bar would redirect the route of the strap. Simultaneously, contrary to obvious belief the retraction with even more powerful spring will be more controlled due to the different route of the strap and the feel of using the product will be more solid. When retracting the speed will be remarkably reduced as the highest peaks of the spring force will be transferred to the added bar and to the more complex routing of the strap, while surprisingly the spring still will have power to retract the strap fully all the way to the device.

Considerable advantages are obtained by certain embodiments of the present invention. A time saving and injury preventing securing device or method for securing of cargo or carrying an object is provided. The securing device is still fast, compact and is as safe to use as non-retractable traditional cargo securing or carrying devices. Also all of the aspects of the invention allow the product to be usable for a lot longer time by enabling either more powerful spring or even if the spring breaks or wears down in case of less powerful spring due to the winding handle the product retains its compact usefulness while also saving natural resources for not necessarily needing a replacement device as opposed to the situation with the current devices.

The proposed invention reduces the recoil speed of the strap onto the spool by means of automatically adjusting the frictional resistance of the device in direct relationship to the recoil speed of the strap.

'Tie down' cargo straps and carrying straps present a particular risk if not handled with the benefit of experience. If an unsecured strap is released when fully or even partially extended, the energy of the recoil spring will provide sufficient force to 'catapult' the steel securing hook and ring towards the user with the potential of causing serious injury. The present invention eliminates or at least reduces the risk of injuries.

Additionally, the longitudinal openings of the first part in the form of a tube or the longitudinal opening of the movable part in the form of a plate prevent the strap from twisting directly before recoiling.

BRIEF DESCRIPTION OF THE DRAWINGS

For a more complete understanding of particular embodiments of the present invention and their advantages, reference is now made to the following descriptions, taken in conjunction with the accompanying drawings. In the drawings:

FIG. 3A illustrates a schematic cross-sectional view of a detail of a spring loaded retractable device in accordance with at least some embodiments of the present invention, wherein a strap is shown at rest, FIG. 3B illustrates a schematic cross-sectional view of a detail of a spring loaded retractable device in accordance with at least some embodiments of the present invention, wherein a strap is shown after start of initial acceleration, FIG. 3C illustrates a schematic cross-sectional view of a detail of a spring loaded retractable device in accordance with at least some embodiments of the present invention, wherein a strap is shown at (almost) maximum speed, FIG. 3D illustrates a schematic cross-sectional view of a detail of a spring loaded retractable device in accordance with at least some embodiments of the present invention, wherein a strap is shown after maximum speed and during slowing down, FIG. 3E illustrates a schematic cross-sectional view of a detail of a spring loaded retractable device in accordance with at least some embodiments of the present invention, wherein the strap is shown during slower speed.

EMBODIMENTS

In this document, the term "strap" is used. In this document, the term "strap" means not only a flat profile, but also a profile with a circular cross section. Such structures are typically also referred to as ropes or cords. The term "strap"

in this document also covers or includes cross sections of profiles that are typically called as ropes or cords.

Figure 1:
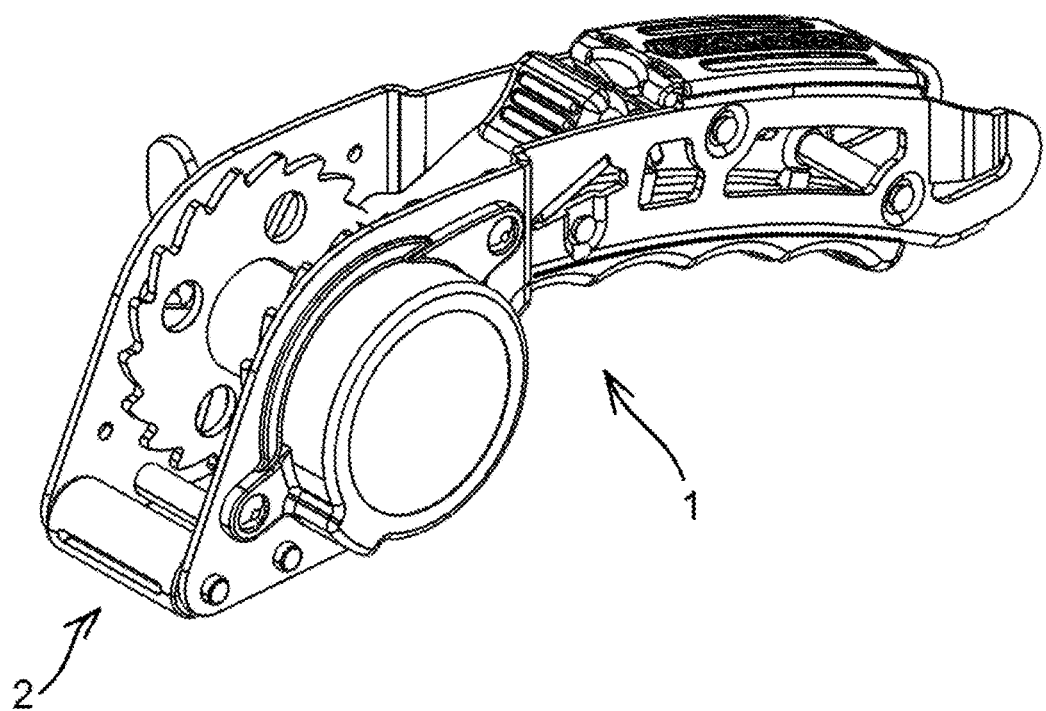
FIG. 1 illustrates a schematic perspective view of a spring loaded retractable device in accordance with at least some embodiments of the present invention.

In FIG. 1 a perspective view of a spring loaded retractable device 1 in accordance with at least some embodiments of the present invention is illustrated. The device 1 comprises a so called dynamic clamping device 2 for reducing a speed of a moving strap (not shown) and an attachment means (not shown), for example a hook, ring or eyelet, coupled to an end of the strap. The dynamic clamping device 2 is shown and described in connection with FIGS. 3A-3E in more detail.

Figure 2:
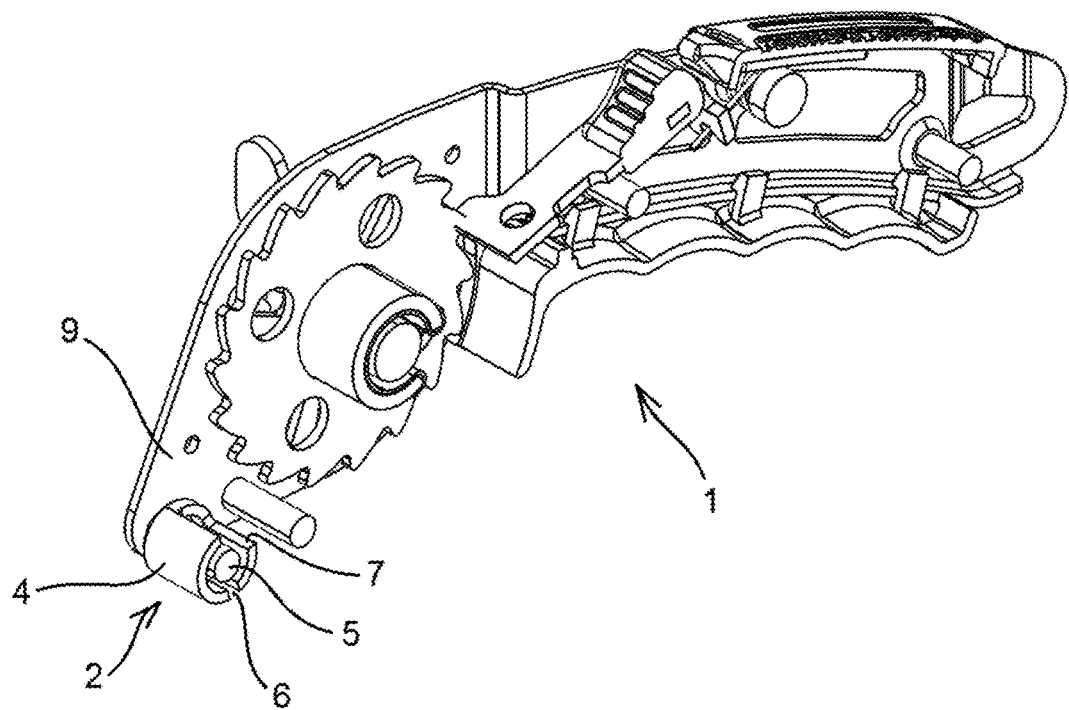
FIG. 2 illustrates a cutaway view of a spring loaded retractable device in accordance with at least some embodiments of the present invention.

In FIG. 2 a cutaway view of a spring loaded retractable device 1 in accordance with at least some embodiments of the present invention is illustrated. The spring loaded retractable device 1 in the form of a securing device comprises a frame 9, a hollow first part 4 having a first opening 6 and a second opening 7, and a second part 5 arranged within the hollow first part 4 and fixedly connected to the frame 9. The hollow first part 4 is configured to move relative to the second part 5 due to friction caused by a moving strap 3. The dynamic clamping device 2 and the strap 3 are shown in FIGS. 3A-3E in more detail.

The hollow first part 4 is configured to move relative to the second part 5 due to friction caused by a strap (not shown) moving through the first opening 6 of the first part 4, a cavity 8 of the first part 4 and the second opening 7 of the first part 4. The first part 4 is in the form of a tube and the second part 5 is in the form of a tube or cylinder. The first part 4 and the second part 5 are axially aligned. The device 1 is configured to reduce a speed of the moving strap.

In FIG. 3A a schematic cross-sectional view of a detail of a spring loaded retractable device in accordance with at least some embodiments of the present invention is illustrated, wherein a strap 3 is shown at rest. A so called dynamic clamping device and the strap 3 are shown. The clamping device 2 comprises a hollow first part 4. The hollow first part 4 may be, for example, in the form of a tube. The tube may have a circular or an elliptical cross-section, for instance. Within the tube a second part 5 is arranged in a cavity 8 of the first part 4. The second part 5 may be in the form of a tube or solid cylinder, for instance. The hollow first part 4 comprises a first opening 6 and a second opening 7. The second opening 7 may be greater than the first opening 6, for instance. The strap 3 passes through the first opening 6 and is deflected by the second part 5, which is typically a fixed round spacer bar used in the construction of the frame of the securing device (not shown), before passing through the second opening 7. The hollow first part 4 is configured to move relative to the second part 5. In other words, the hollow first part 4 is configured to float around the second part 5.

In FIG. 3B a schematic cross-sectional view of a detail of a spring loaded retractable device in accordance with at least some embodiments of the present invention is illustrated, wherein a strap 3 is shown after start of initial acceleration. By pressing a button of the securing device the strap 3 is starting to move due to releasing the energy stored by the clock spring. As the strap 3 is drawn onto the spool of the securing device, the first part 4 tilts in response to the frictional resistance of the strap 3 on the contact surfaces.

In FIG. 3C a schematic cross-sectional view of a detail of a spring loaded retractable device in accordance with at least some embodiments of the present invention is illustrated, wherein a strap is shown at (almost) maximum speed. The frictional resistance of the strap 3 increases as the speed increases on the first part's 4 contact surfaces such that the first part 4 is pulled closer to the second part 5.

In FIG. 3D a schematic cross-sectional view of a detail of a spring loaded retractable device in accordance with at least some embodiments of the present invention is illustrated, wherein a strap 3 is shown after maximum speed and during slowing down. In the shown figure, an optimum recoil speed is achieved. The first opening 6 of the first part 4 is partially obstructed by the second part 5 such that the strap 3 is compressed between the surfaces of the first part 4 and the second part 5. Thus, a progressive braking effect is created.

In FIG. 3E a schematic cross-sectional view of a detail of a spring loaded retractable device in accordance with at least some embodiments of the present invention is illustrated, wherein the strap 3 is shown during slower recoiling. In the shown figure, the strap 3 is free to move as shown in FIG. 3B. As the strap 3 accelerates again, the aforementioned sequence is repeated.

Figure 4A:
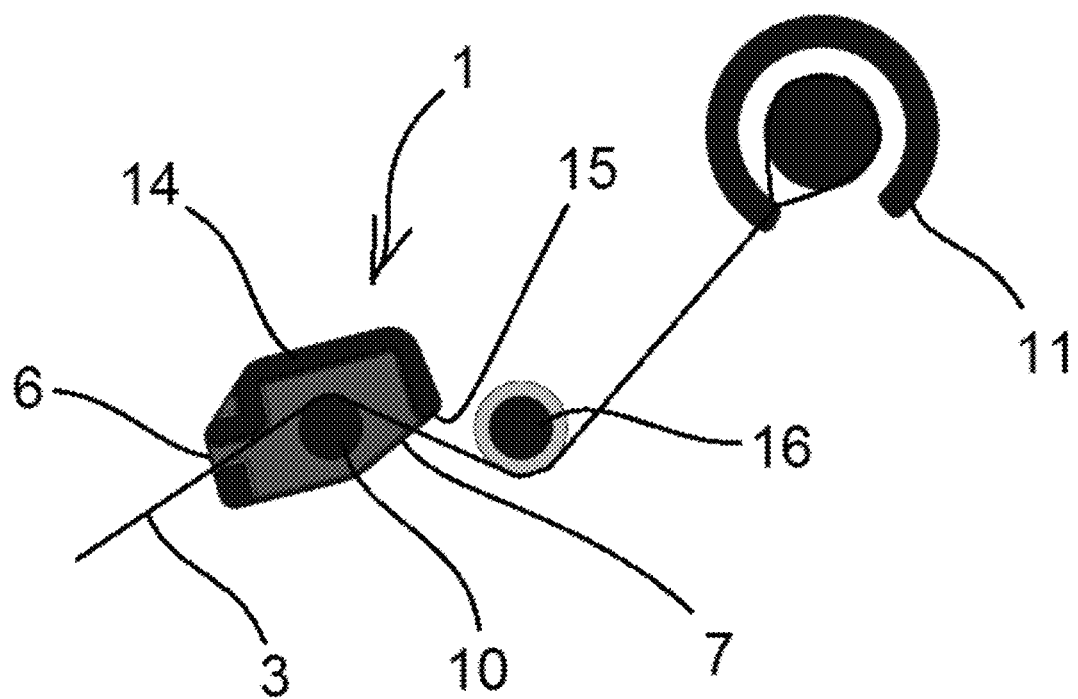
FIG. 4A illustrates a schematic cross-sectional view of a detail of another spring loaded retractable device in accordance with at least some embodiments of the present invention, wherein a movable part is shown in its rest position.

In FIG. 4A a schematic cross-sectional view of a detail of another spring loaded retractable device in accordance with at least some embodiments of the present invention is illustrated. The spring loaded retractable device 1 comprises a frame (not shown) and a movable part 14 hinged to the frame. The movable part 14 comprises an opening 6 radially aligned to a first pin 10. The first pin 10 is fixedly connected to the frame. A strap 3 is movable through the opening 6. The material of the movable part 14 may be, for example, a polymer.

A shape of the opening 6 corresponds substantially to a cross-section of the strap 3. The shape of the opening 6 may be, for example, in the form of an elongated rectangle corresponding substantially to a strap 3 having a cross section in the form of a rectangle. The main dimension of the opening 6 therefore corresponds to a width of the strap 3. In other cases, the opening 6 may be circular and corresponds substantially to a diameter of the strap 3, for instance. The opening 6 is arranged at a distance from the axis of rotation of the movable part 14. The axis of rotation is formed by the first pin 10.

The device 1 further comprises a guide pin 16 between the first pin 10 and a spool 11. The guide pin 16 is positioned such that the angle of the strap 3 and the path or trajectory of the strap 3 between the guide pin 16 and the first pin 10 maintains constant during recoiling. This is important as it eliminates one variable, i.e. the change in strap angle as well as strap path or trajectory as the spool diameter changes during recoiling. Consequently, simplification of the design of the device is allowed whilst optimising performance.

When the spool 11 recoils the strap 3, the strap 3 moves between the first pin 10 and the guide pin 16. The strap 3 also moves through a part of the movable part 14 and the opening 6. The movable part 14 is configured to move from a first position into a second position by rotating around an axis of rotation as indicated by arrow 13 in FIG. 4B due to friction between the movable part 14 and the moving strap 3. In FIG. 4A, the movable part 14 is shown in its rest position.

The shown device can also be described as follows: The spring loaded retractable device comprises a frame (not shown), a hollow first part having a first opening and a second opening, and a second part arranged at least partially within the hollow first part. The second part, e.g. in the form of a cylinder or tube, is fixedly connected to the frame and the hollow first part is configured to move relative to the second part due to friction caused by a moving strap 3. In the shown embodiment, first part is configured to rotate or pivot around the central axis of the second part. In FIG. 4A, the strap is "locked" and fully extended. The movable part 14 is shown in the first position.

Figure 4B:
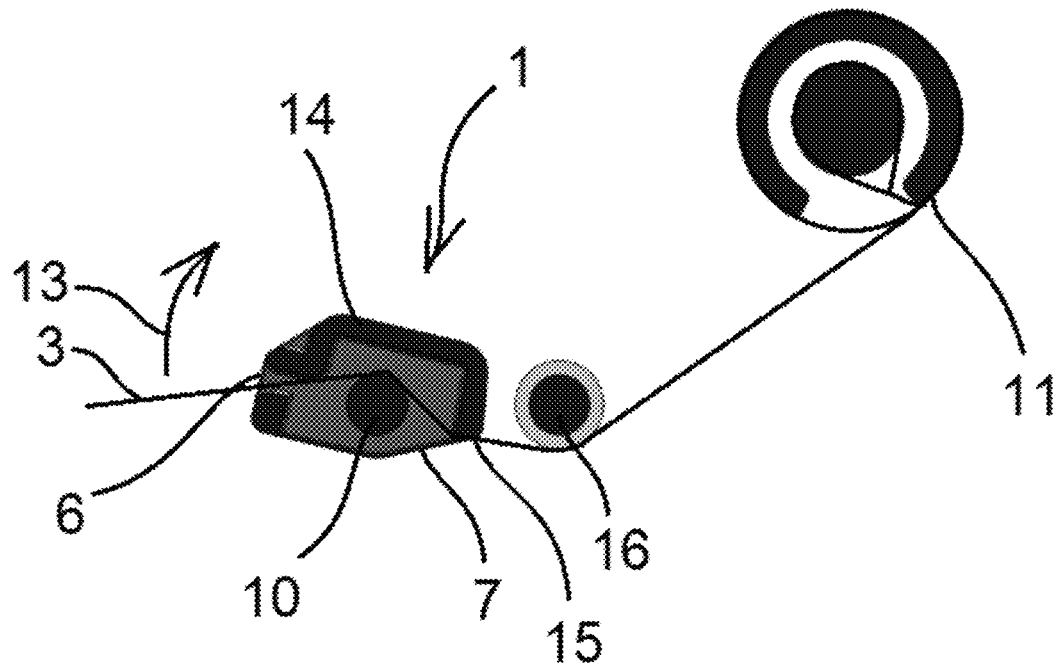
FIG. 4B illustrates a schematic cross-sectional view of a detail of another spring loaded retractable device in accordance with at least some embodiments of the present invention, wherein the movable part has moved into the second position.

In FIG. 4B a schematic cross-sectional view of a detail of another spring loaded retractable device 1 in accordance with at least some embodiments of the present invention is illustrated, wherein the movable part has moved into the second position. As indicated by arrow 13, the movable part 14 has moved from the first position as shown in FIG. 4A into the second position due to friction between the movable part 14 and the moving strap 3 as the strap 3 is drawn onto the spool 11.

The movable part 14 further comprises a trailing edge 15 or trailing surface. The device 1 is configured such that the moving strap contacts the trailing edge 15 in the second position, thus causing friction between the trailing edge 15 of the movable part 14 and the strap 3. Consequently, the speed of moving strap 3 is reduced due to the friction. In other words, the device 1 is configured such that friction between the trailing edge 15 and the moving strap 3 reduces speed of the moving strap 3. The resulting increase in frictional resistance reduces the strap recoil speed to a "safe limit".

Figure 4C:
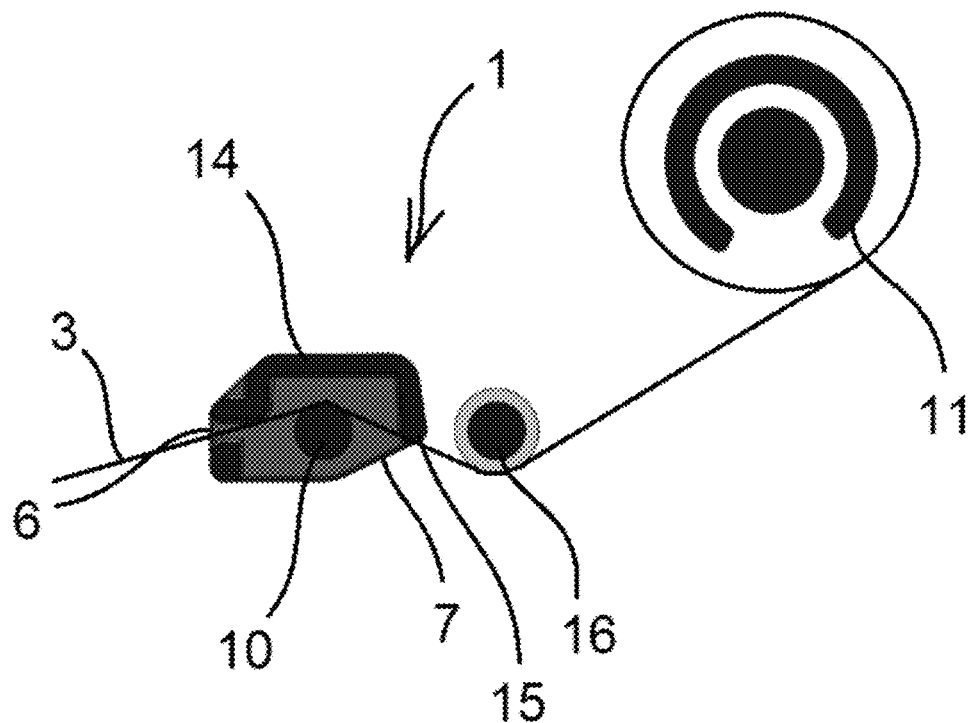
FIG. 4C illustrates a schematic cross-sectional view of a detail of another spring loaded retractable device in accordance with at least some embodiments of the present invention, wherein the strap recoils at slow speed.

In FIG. 4C a schematic cross-sectional view of a detail of another spring loaded retractable device 1 in accordance with at least some embodiments of the present invention is illustrated, wherein the strap 3 recoils at slow speed. A cross-sectional view of the device recoiling at a 'safe limit' is shown. The frictional resistance of the strap and its speed on the moving parts' contact surfaces is insufficient to tilt the moving part 14 into the second position, provided that the strap recoil speed does not exceed the 'safe limit'. The moving part 14 is shown in a third position between the first position and the second position. The trailing edge 15 is not in contact with the moving strap 3.

Figure 4D:
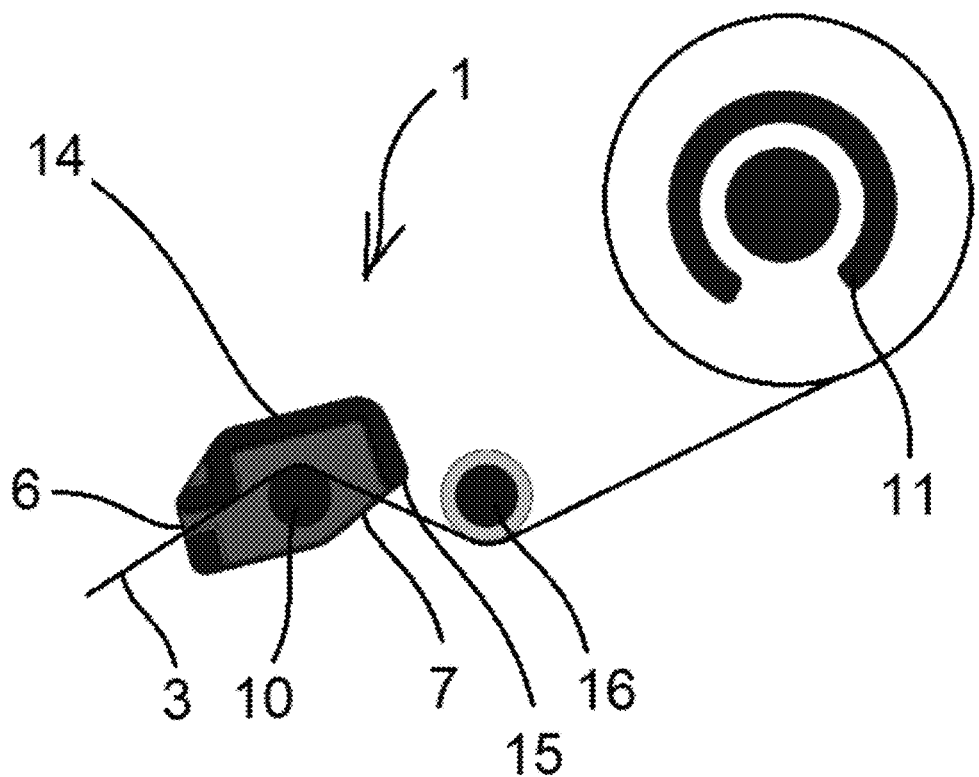
FIG. 4D illustrates a schematic cross-sectional view of a detail of another spring loaded retractable device in accordance with at least some embodiments of the present invention, wherein the strap is fully recoiled.

In FIG. 4D a schematic cross-sectional view of a detail of another spring loaded retractable device in accordance with at least some embodiments of the present invention is illustrated. A cross-sectional view of the device 1, when the strap is at rest is shown, wherein the strap is fully recoiled.

Figure 5A:
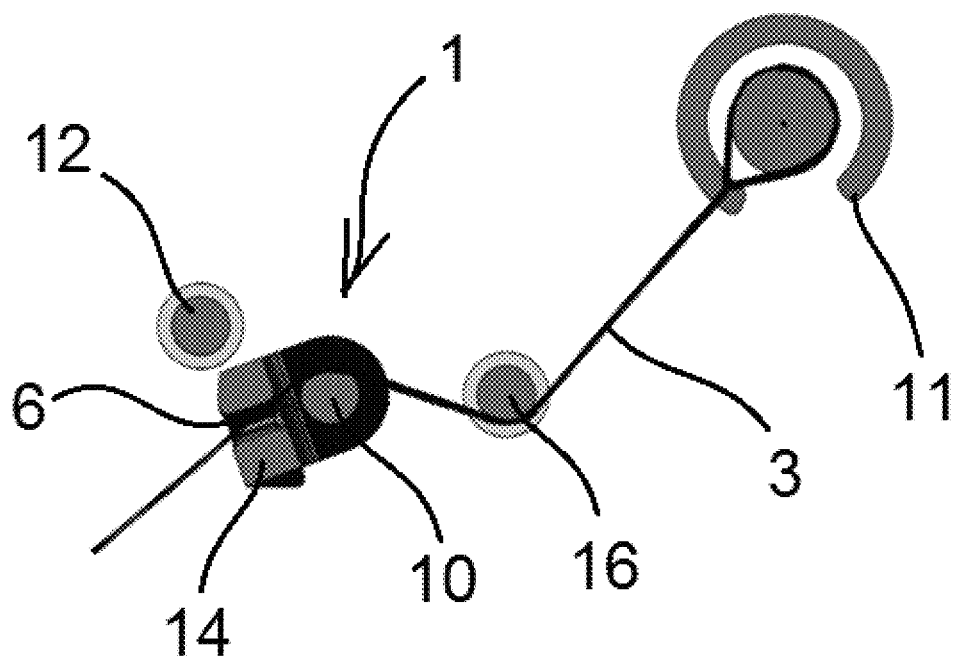
FIG. 5A illustrates a schematic cross-sectional view of a detail of a further spring loaded retractable device in accordance with at least some embodiments of the present invention, wherein a strap is shown at rest.

In FIG. 5A a schematic cross-sectional view of a detail of a further spring loaded retractable device 1 in accordance with at least some embodiments of the present invention is illustrated, wherein a strap 3 is shown at rest. The strap 3 is locked and fully extended. The spring loaded retractable device 1 comprises a frame (not shown) and a movable part 14 hinged to the frame. The movable part 14 comprises an opening 6 radially aligned to a first pin 10. The first pin 10 is fixedly connected to the frame. A strap 3 is movable through the opening 6. The material of the movable part 14 may be, for example, a polymer.

A shape of the opening 6 corresponds substantially to a cross-section of the strap 3. The shape of the opening 6 may be, for example, in the form of an elongated rectangle corresponding substantially to a strap having a cross section in the form of a rectangle. The main dimension of the opening 6 therefore corresponds to a width of the strap. In other cases, the opening 6 may be circular and corresponds substantially to a diameter of the strap, for instance. The opening 6 is arranged at a distance from the axis of rotation of the movable part 14. The axis of rotation is formed by the first pin 10.

The device 1 further comprises a guide pin 16 between the first pin 10 and a spool 11. The guide pin 16 is positioned such that the angle of the strap and the path or trajectory of the strap between the guide pin 16 and the first pin 10 maintains constant during recoiling. This is important as it eliminates one variable, i.e. the change in strap angle as well as strap path or trajectory as the spool diameter changes during recoiling. Consequently, simplification of the design of the device is allowed whilst optimising performance.

When the spool 11 recoils the strap, the strap is movable between the first pin 10 and the guide pin 16. The strap also moves through a part of the movable part 14 and the opening 6. The movable part 14 is configured to move from a first position as illustrated into a second position by rotating around an axis of rotation as indicated by arrow 13 in FIG. 5B due to friction between the movable part 14 and the moving strap. In FIG. 5A, the movable part 14 is shown in its rest position.

The device further comprises a second pin 12 or another structure such as a part of a housing of the device 1. The function of the second pin 12 or other structure is described below in connection with FIG. 5B.

Figure 5B:
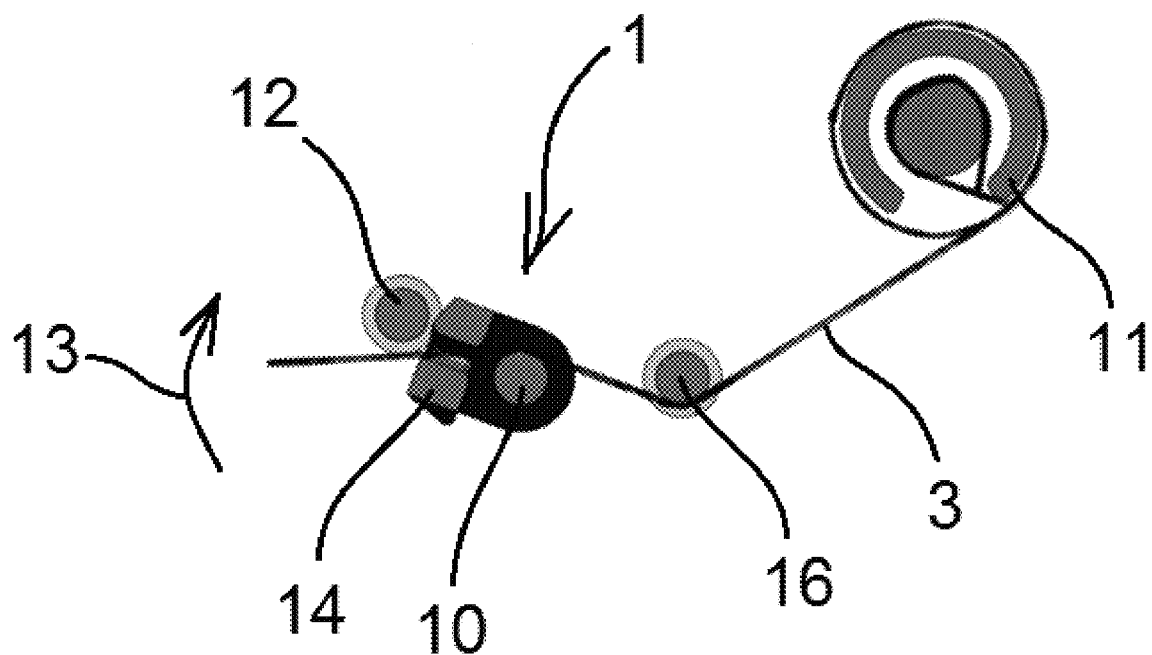
FIG. 5B illustrates a schematic cross-sectional view of a detail of a further spring loaded retractable device in accordance with at least some embodiments of the present invention, wherein the movable part has moved into the second position.

In FIG. 5B a schematic cross-sectional view of a detail of a further spring loaded retractable device in accordance with at least some embodiments of the present invention is illustrated. As indicated by arrow 13, the movable part 14 has moved from the first position as shown in FIG. 5A into the second position due to friction between the movable part 14 and the moving strap 3 as the strap 3 is drawn onto the spool 11.

The spring loaded retractable device 1 is configured such that the moving strap 3 contacts a second pin 12 or another structure in the second position. The device 1 is configured such that friction between the second pin 12 or the other structure and the moving strap 3 reduces speed of the moving strap 3. Consequently, recoil speed is reduced as long as the movable part 14 is in the second position.

A cross-sectional view of the strap 3 recoiling as the potential energy of the clock spring is released is shown. As the strap 3 is drawn onto the spool 11 the moving part 14 tilts in response to the frictional resistance of the strap 3 and its speed on the moving parts 14 contact surfaces. The strap recoil speed is at its fastest when the stored potential energy is at its maximum (when the clock spring is released when tightly wound). The tilt of the moving part 14 is instantaneously causing the strap entering the moving parts' opening 6 to be forced up against the underside of the forward pin 12. The resulting increase in frictional resistance reduces the strap recoil speed to a "safe limit".

According to a certain embodiment, the device 1 comprises a lip (not shown) projecting from the movable part 14. In such a case, the speed of the moving strap 3, which moves between the second pin 12 or structure and the lip, is reduced due to friction between the strap 3, the first pin 12 or structure and the lip. Thus, an additional frictional area is provided to improve the breaking effect. The lip further allows a greater clearance between the moving part 14 and the second pin 12 or structure.

Figure 5C:
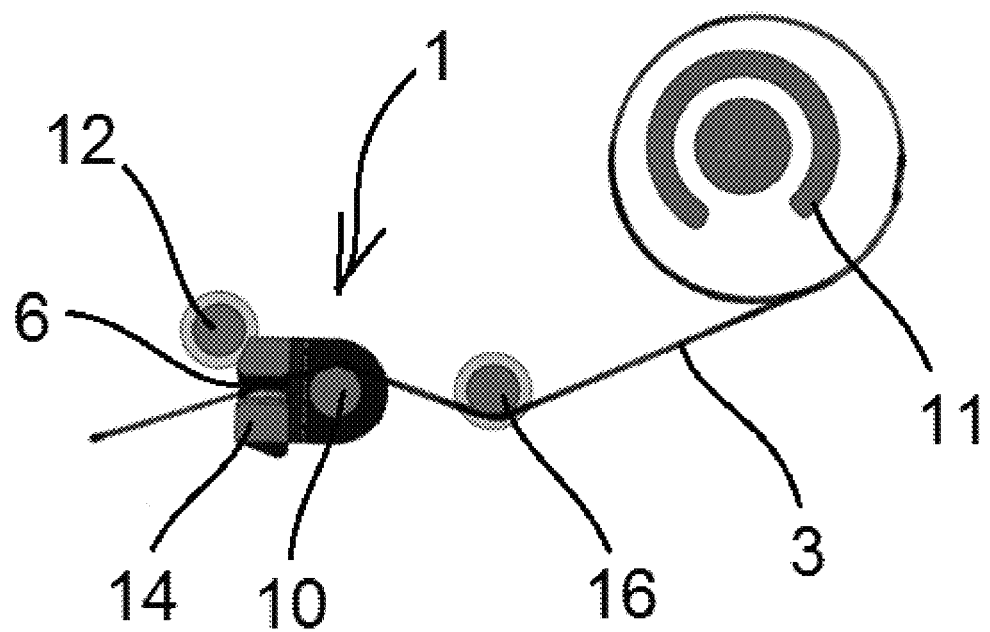
FIG. 5C illustrates a schematic cross-sectional view of a detail of a further spring loaded retractable device in accordance with at least some embodiments of the present invention, wherein the strap recoils at slow speed.

In FIG. 5C a schematic cross-sectional view of a detail of a further spring loaded retractable device in accordance with at least some embodiments of the present invention is illustrated. A cross-sectional view of the device 1 recoiling at a 'safe limit' is shown. The frictional resistance of the strap 3 and its speed on the moving parts' 14 contact surfaces is insufficient to tilt the moving part 14 into the second position, provided that the strap recoil speed does not exceed the 'safe limit'. The moving part 14 is shown in a third position between the first position and the second position. The moving strap 3 is not in contact with the second pin 12.

Figure 5D:
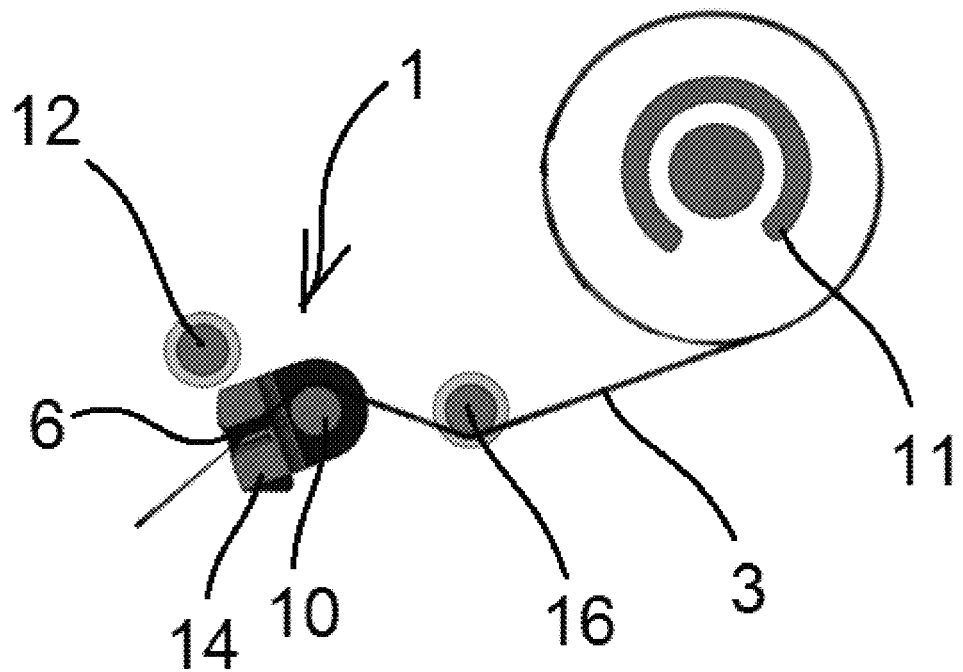
FIG. 5D illustrates a schematic cross-sectional view of a detail of a further spring loaded retractable device in accordance with at least some embodiments of the present invention, wherein the strap is fully recoiled.

In FIG. 5D a schematic cross-sectional view of a detail of a further spring loaded retractable device 1 in accordance with at least some embodiments of the present invention is illustrated. A cross-sectional view of the device 1 and strap 3 at rest is shown, wherein the strap 3 is fully recoiled.

Figure 5E:
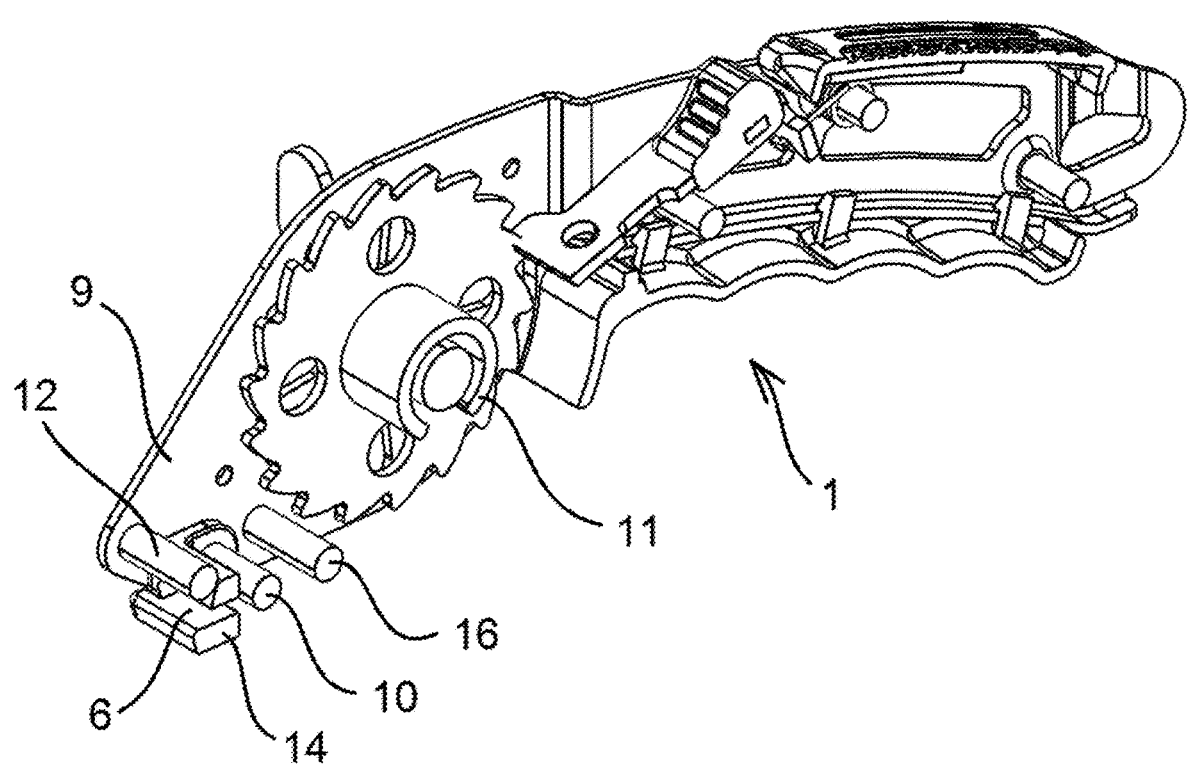
FIG. 5E illustrates a cutaway perspective view of a half of a further spring loaded retractable device in accordance with at least some embodiments of the present invention.

In FIG. 5E a cutaway perspective view of a half of a further spring loaded retractable device 1 in accordance with at least some embodiments of the present invention is illustrated.

Figure 6A:
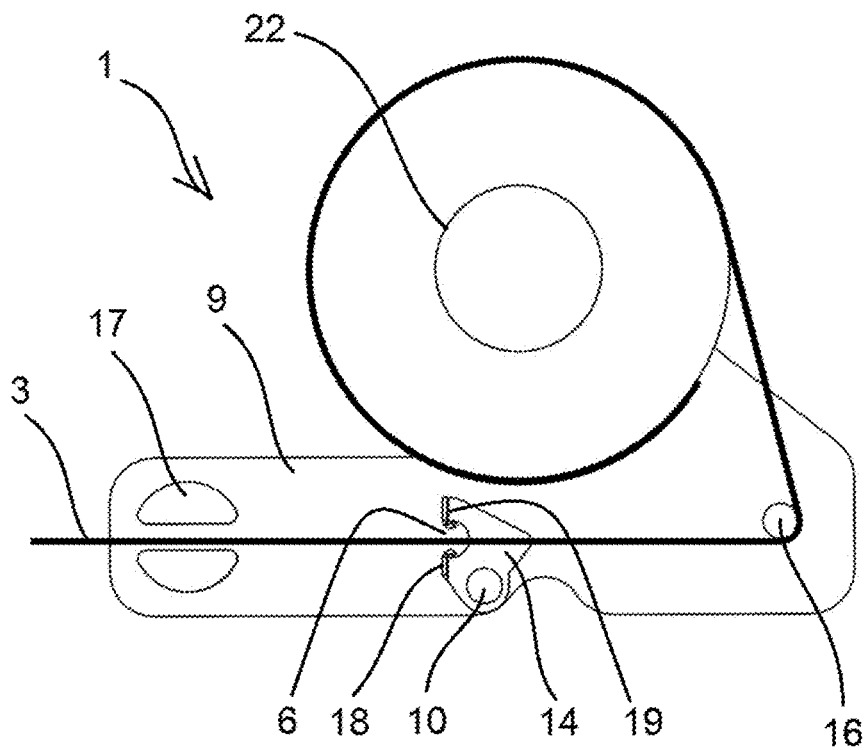
FIG. 6A illustrates a schematic cross-sectional view of a detail of a further spring loaded retractable device in accordance with at least some embodiments of the present invention.

In FIG. 6A a schematic cross-sectional view of a detail of an even further spring loaded retractable device 1 in accordance with at least some embodiments of the present invention is illustrated. The device 1 comprises a frame 9 and a movable part 14 hinged to the frame 9 and comprising an opening 6 or aperture radially aligned to a first pin 10. A strap 3 is movable through the opening 6 or aperture. The movable part 14 is configured to move from a first position into a second position by rotating around an axis of rotation due to friction between the movable part 14 and the moving strap 3. The axis of rotation is formed by a first pin 10 fixedly attached to the frame 9.

The movable part 14 is located between a strap guide pin 16 and a tensioning bobbin 17. The configuration offers superior breaking performance during strap recoil by engaging a plurality of surfaces of the movable part 14 and creating a tortuous pathway for the strap 3 as it passes between the upper 18 and lower 19 surfaces in the braking area of the movable part 14. The device 1 is configured such that friction between surfaces 18, 19 of the movable part 14 and the moving strap 3 reduces speed of the moving strap 3 in the second position. The following FIGS. 6B-6F illustrate the principle of the safety break in more detail.

Figure 6B:
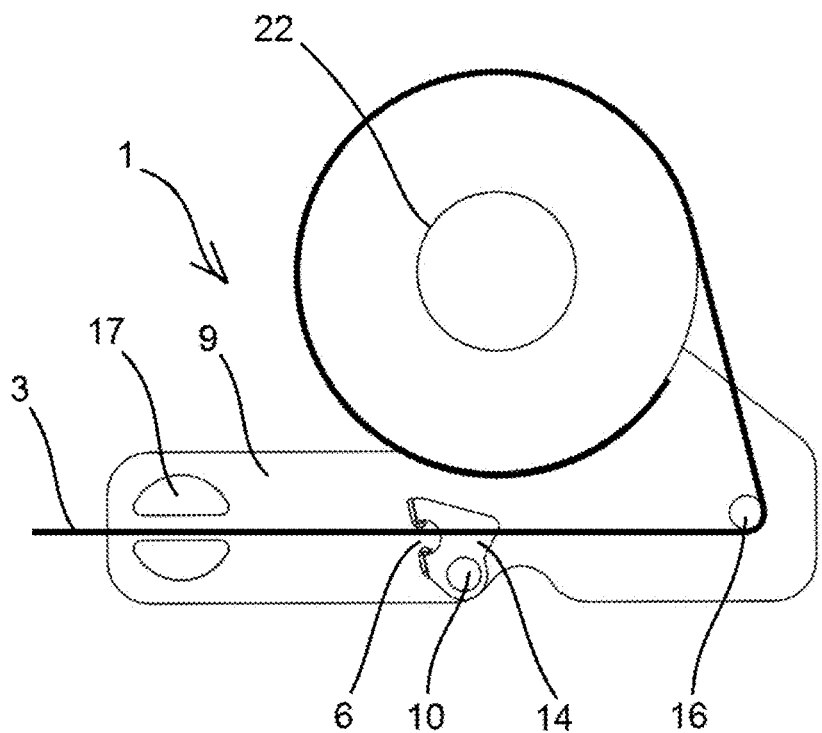
FIG. 6B illustrates a schematic cross-sectional view of a detail of a further spring loaded retractable device in accordance with at least some embodiments of the present invention, wherein a fully recoiled strap is shown at rest.

In FIG. 6B a schematic cross-sectional view of a detail of an even further spring loaded retractable device 1 in accordance with at least some embodiments of the present invention is illustrated. The figure illustrates a fully recoiled strap at rest on a retractable tie down oriented as shown. The moving part 14 typically tilts due to its "off balance" design such that one wall of the opening 6 rests on an upper surface of the strap 3.

Figure 6C:
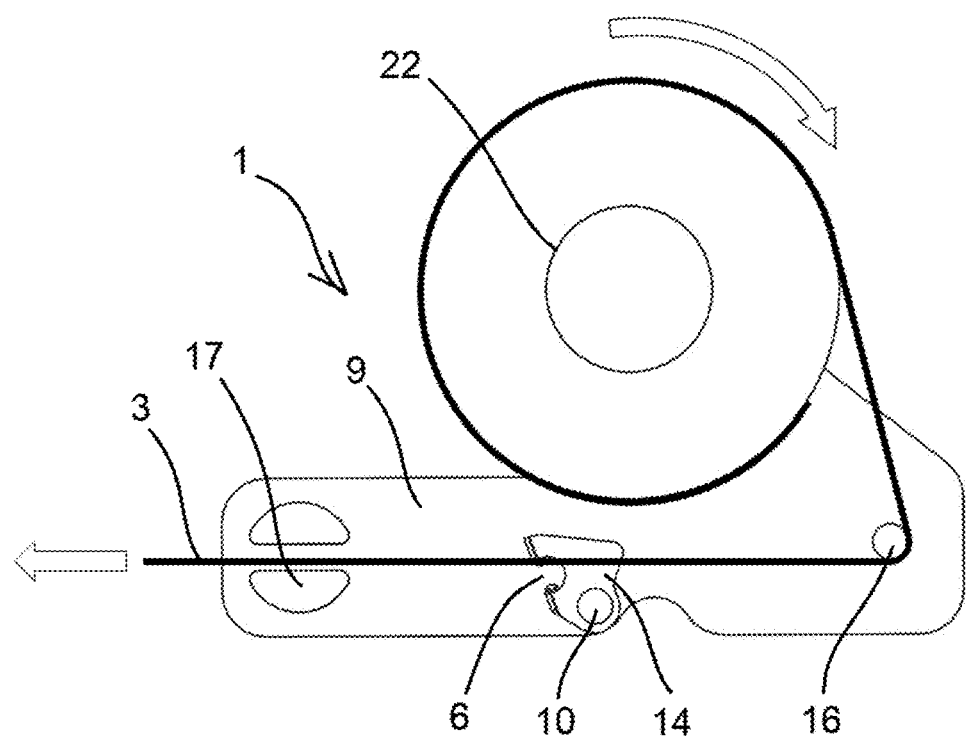
FIG. 6C illustrates a schematic cross-sectional view of a detail of a further spring loaded retractable device in accordance with at least some embodiments of the present invention, wherein the strap is pulled out.

In FIG. 6C a schematic cross-sectional view of a detail of an even further spring loaded retractable device 1 in accordance with at least some embodiments of the present invention is illustrated. The figure illustrates the strap 3 being pulled out through the tensioning bobbin 17. The moving part 14 offers very little frictional resistance to the extending strap as only the aperture wall surface is in contact with the strap 3.

Figure 6D:
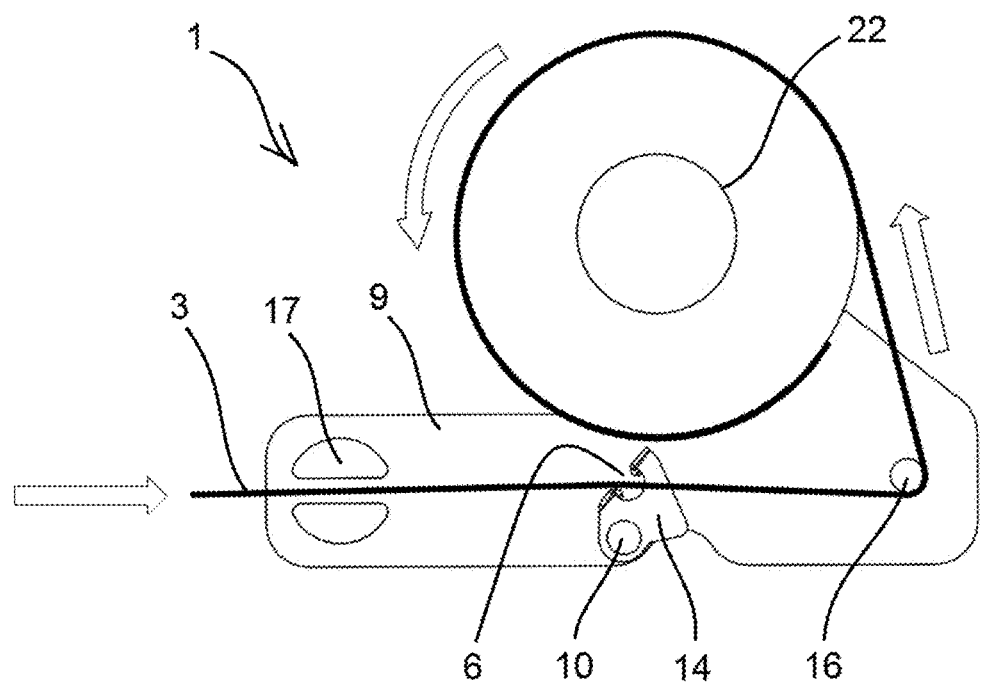
FIG. 6D illustrates a schematic cross-sectional view of a detail of a further spring loaded retractable device in accordance with at least some embodiments of the present invention, wherein the strap has started to recoil.

In FIG. 6D a schematic cross-sectional view of a detail of an even further spring loaded retractable device 1 in accordance with at least some embodiments of the present invention is illustrated. The figure illustrates a partially or fully extended recoiling strap 3. In this mode the strap 3 can recoil at speeds up to, for example, 5 m/s, thus creating a serious hazard to the user or an unsupervised child playing with the retractable device 1. The purpose of the moving part 14 is to reduce and/or control the recoil speed of the strap 3 to avoid injury from the strap 3 itself or from a metal attachment such as a hook, ring or eyelet that can be projected towards the user at high speed.

The radial offset of the opening 6 from the first pin 10, also called the pivot pin, and the distance of the strap 2 above the first pin 10 are approximately identical such that when the strap 3 recoils the frictional resistance of surfaces of the moving part 14 on the upper and lower surfaces of the strap 3 turn the moving part clockwise.

Figure 6E:
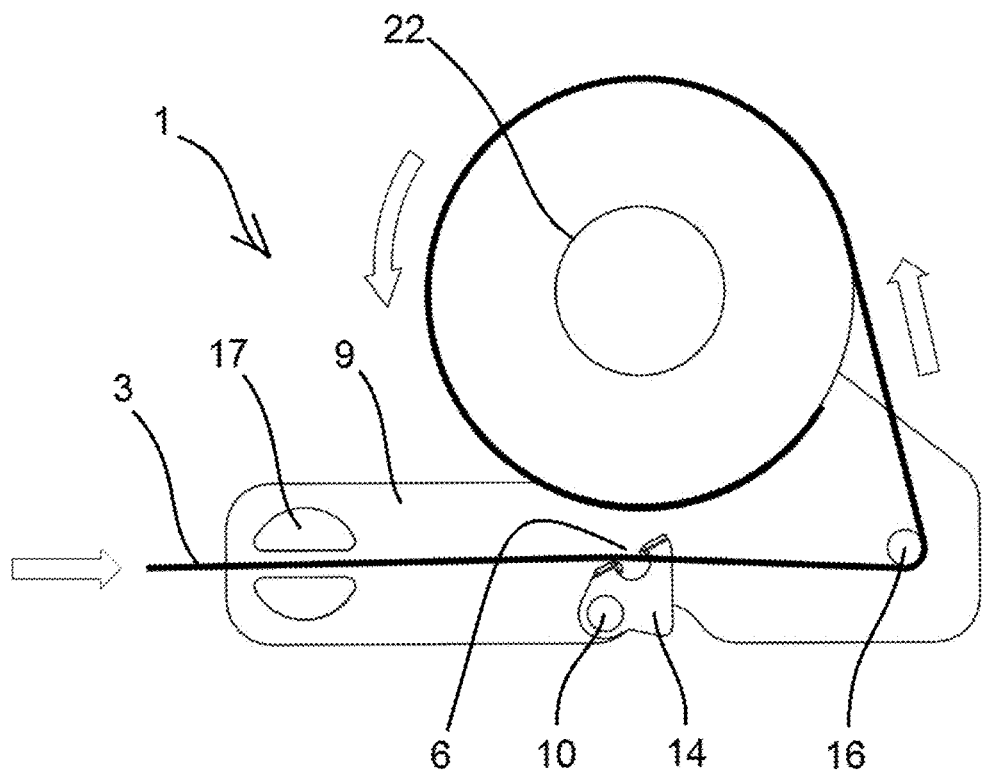
FIG. 6E illustrates a schematic cross-sectional view of a detail of a further spring loaded retractable device in accordance with at least some embodiments of the present invention, wherein the strap has recoiled further.
Figure 6F:
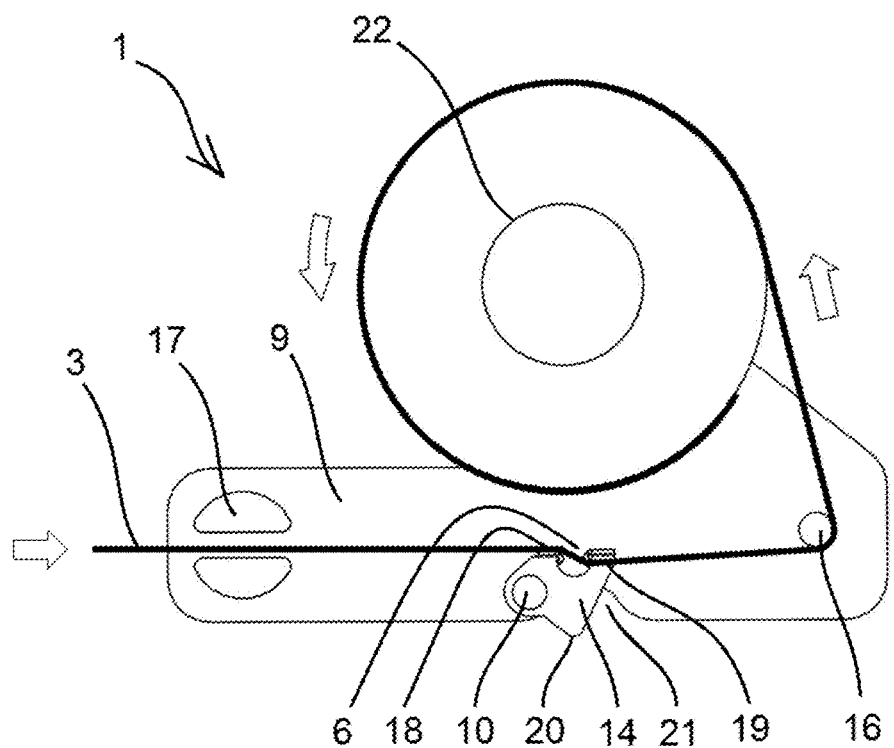
FIG. 6F illustrates a schematic cross-sectional view of a detail of a further spring loaded retractable device in accordance with at least some embodiments of the present invention, wherein a maximum braking effect is achieved in the second position of the movable part.

In FIG. 6E a schematic cross-sectional view of a detail of an even further spring loaded retractable device 1 in accordance with at least some embodiments of the present invention is illustrated. The figure illustrates a further angular clockwise rotation of the moving part 14 as shown in FIG. 6D. The braking is progressive and will continue until equilibrium is achieved when the lower surface 19 and the upper surface 18 are in frictional contact with the lower and upper surfaces of the strap 3 as shown in FIG. 6F. The braking effect can be simply adjusted in the design process by adjusting the width and depth of the opening 6 or aperture. It is important to note that the primary function of the moving part 14 is to ensure that the strap recoils at a safe speed and not to slow the strap recoil to a point that frustrates the user.

In FIG. 6F a schematic cross-sectional view of a detail of an even further spring loaded retractable device 1 in accordance with at least some embodiments of the present invention is illustrated. The figure illustrates the moving part 14 in equilibrium when the maximum braking effect is achieved. It is important to note that the full braking effect must out of necessity take place within a very short period, for example within $1/10$s. The maximum braking effect is achieved when the moving part 14 rotates clockwise until all of its four surfaces are in contact with the strap 3 and a tortuous pathway is created for the strap 3 between the upper surface 18 and the lower surface 19 of the moving part 14. The movable part 14 is shown in the second position.

According to certain embodiments, the recoil speed can be increased manually by pressing raised button 20 accessible through indentation 21 until the desired recoil speed is achieved.

The recoiled strap can be extended at anytime. By pulling the strap out through the bobbin 4 the moving part rotates anticlockwise due to the frictional resistance between the strap 3 and the moving part 14 until the moving part 14 naturally orientates to the position illustrated in FIG. 6C.

Figure 6G:
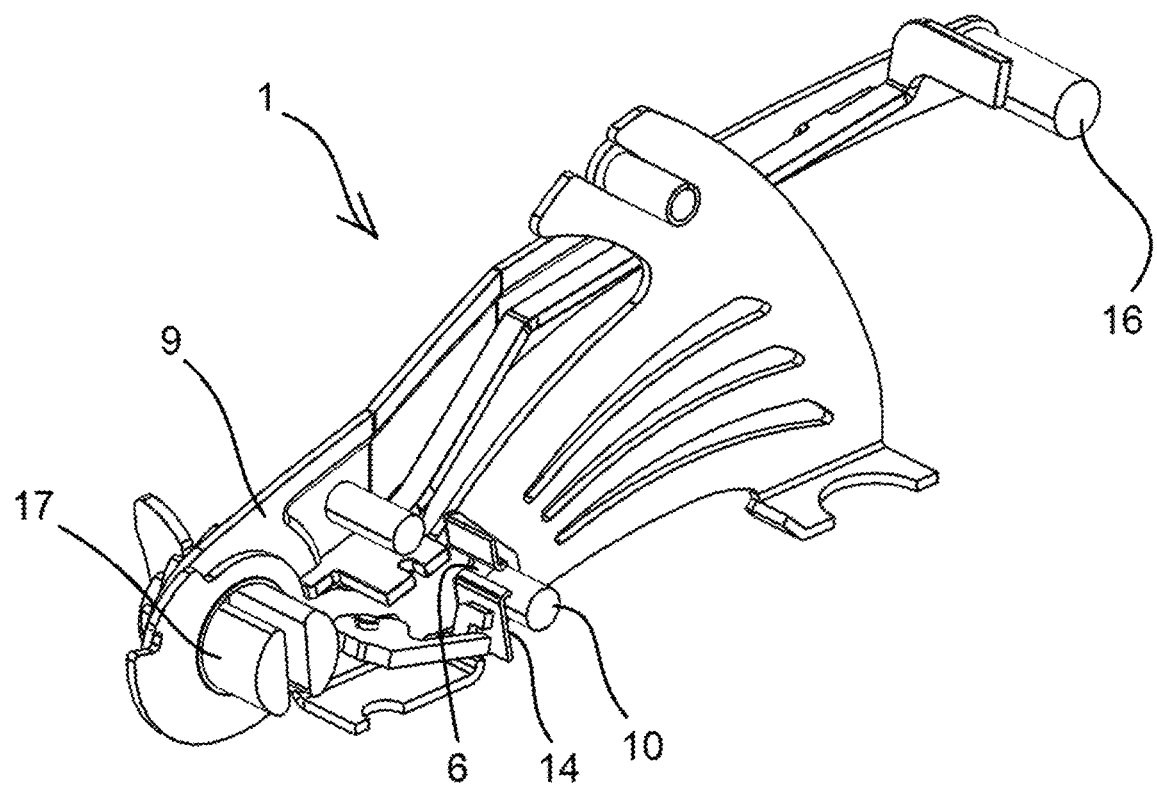
FIG. 6G illustrates a cutaway perspective view of details of a half of an even further spring loaded retractable device in accordance with at least some embodiments of the present invention.

In FIG. 6G a schematic perspective view of details of a half of an even further spring loaded retractable device 1 in accordance with at least some embodiments of the present invention is illustrated.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the above description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in spring loaded retractable securing devices.

REFERENCE SIGNS LIST 1 spring loaded retractable device
2 clamping device
3 strap
4 first part
5 second part
6 first opening
7 second opening
8 cavity
9 frame
10 first pin
11 spool
12 second pin
13 arrow
14 movable part
15 trailing edge
16 guide pin
17 tensioning bobbin
18 upper surface
19 lower surface
20 button
21 indentation
22 clock spring

CITATION LIST

Patent Literature
U.S. Pat. No. 7,503,736 B1
WO 2015/036724 A1
Non Patent Literature

The invention claimed is:

1. A spring loaded retractable device comprising:
a frame,
a spool having a first axis of rotation, and
a movable part having a second axis of rotation, the movable part being hinged to the frame and comprising an opening spaced apart from the second axis of rotation, wherein a strap is movable through the opening,
wherein the movable part is configured to move from a first position into a second position by rotating around the second axis of rotation in opposite direction of the spool, and
wherein the second axis of rotation is formed by a first pin, wherein the first pin is fixedly connected to the frame.

2. The spring loaded retractable device according to claim 1, wherein a shape of the opening corresponds substantially to a cross-section of the strap.

3. The spring loaded retractable device according to claim 1, wherein the opening is longitudinal and corresponds substantially to a width of the strap or the opening is circular and corresponds substantially to a diameter of the strap.

4. The spring loaded retractable device according to claim 1, wherein the opening is arranged at a distance from the second axis of rotation of the movable part.

5. The spring loaded retractable device according to claim 1, wherein the device further comprises a guide pin between the first pin and a spool.

6. The spring loaded retractable device according to claim 5, wherein the strap is movable between the first pin and the guide pin.

7. The spring loaded retractable device according to claim 1, wherein the device is configured such that the moving strap contacts a second pin in the second position.

8. The spring loaded retractable device according to claim 7, wherein the device is configured such that friction between the second pin and the moving strap reduces speed of the moving strap in the second position.

9. The spring loaded retractable device according to claim 7, wherein the device further comprises a lip projecting from the movable part.

10. The spring loaded retractable device according to claim 1, wherein the movable part further comprises a trailing edge, and wherein the device is configured such that the moving strap contacts the trailing edge in the second position.

11. The spring loaded retractable device according to claim 10, wherein the device is configured such that friction between the trailing edge and the moving strap reduces speed of the moving strap in the second position.

12. The spring loaded retractable device according to claim 1, wherein the device is configured such that friction between at least one surface of the moving part and the moving strap reduces speed of the moving strap in the second position.

13. The spring loaded retractable device according to claim 1, wherein the device is a securing device, a tape measure, a dog leash or an animal leash.

14. The spring loaded retractable device according to claim 1, wherein the movable part is configured to move from the first position into the second position by rotating around the second axis of rotation in opposite direction of the spool due to friction between the movable part and the moving strap.

15. A spring loaded retractable device comprising:
a frame,
a hollow first part having a first opening and a second opening, and
a second part arranged at least partially within the hollow first part,
wherein the second part is fixedly connected to the frame and the hollow first part is configured to move relative to the second part due to friction caused by a moving strap or wherein the hollow first part is fixedly connected to the frame and the second part is configured to move relative to the hollow first part due to friction caused by a moving strap, and
wherein the hollow first part is configured to move relative to the second part due to friction caused by a strap moving through the first opening of the first part, a cavity of the first part and the second opening of the first part, and wherein the first part and the second part are axially aligned.

16. The device according to claim 15, wherein the first part is in the form of a tube or wherein the cross-section of the first part is in the form of an ellipse or polygon.

17. The device according to claim 15, wherein the second part is in the form of a tube or cylinder or wherein the cross-section of the second part is in the form of an ellipse or polygon.

18. A method of manufacturing a spring loaded retractable device, the method comprising:
providing a spring loaded retractable device having a frame,
providing a hollow first part having a first opening and a second opening,
arranging the first part such that a second part is located within the hollow first part and fixedly connected to the frame, and
arranging a strap such that a part of the strap extends through the first opening of the first part, a cavity within the first part and the second opening of the first part,
wherein the first part is arranged such that the first part is capable of moving relative to the second part due to friction caused by the strap when the strap moves or wherein the second part is arranged such that the second part is capable of moving relative to the first part due to friction caused by the strap when the strap moves.

\* \* \* \* \*